ized*

United States Patent
Kurupati et al.

(10) Patent No.: US 10,601,862 B1
(45) Date of Patent: Mar. 24, 2020

(54) MITIGATING AUTOMATED ATTACKS IN A COMPUTER NETWORK ENVIRONMENT

(71) Applicant: Akamai Technologies, Inc., Cambridge, MA (US)

(72) Inventors: Sreenath Kurupati, Sunnyvale, CA (US); Sridhar Machiroutu, Fremont, CA (US); Prajakta Bhurke, Fremont, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 88 days.

(21) Appl. No.: 15/652,020

(22) Filed: Jul. 17, 2017

Related U.S. Application Data (60) Provisional application No. 62/363,175, filed on Jul. 15, 2016.

(51) Int. Cl.
| | | |
|---|---|---|
| *G06F 21/55* | (2013.01) | |
| *G06F 21/56* | (2013.01) | |
| *H04L 29/06* | (2006.01) | |
| *G06N 20/00* | (2019.01) | |

(52) U.S. Cl.
CPC ........ *H04L 63/1441* (2013.01); *G06F 21/554* (2013.01); *G06N 20/00* (2019.01); *H04L 63/1416* (2013.01); *G06F 21/55* (2013.01); *G06F 21/56* (2013.01)

(58) Field of Classification Search
CPC . H04L 63/1441; H04L 63/1416; H04L 29/06; G06N 20/00; G06F 21/554; G06F 21/55; G06F 21/56
See application file for complete search history.

(56) References Cited

U.S. PATENT DOCUMENTS

| | | | | |
|---|---|---|---|---|
| 10,298,598 | B1 * | 5/2019 | McClintock | H04L 63/1425 |
| 2002/0184362 | A1 * | 12/2002 | Banerjee | H04L 63/1416 |
| | | | | 709/224 |
| 2015/0128246 | A1 * | 5/2015 | Feghali | H04L 63/0209 |
| | | | | 726/13 |
| 2016/0028764 | A1 * | 1/2016 | Vasseur | H04L 63/1458 |
| | | | | 726/23 |
| 2017/0237776 | A1 * | 8/2017 | Higbee | G06F 16/35 |
| | | | | 726/1 |
| 2018/0063675 | A1 * | 3/2018 | Raghav | H04L 51/02 |

* cited by examiner

*Primary Examiner* — Jayesh M Jhaveri
(74) *Attorney, Agent, or Firm* — David H. Judson (57) ABSTRACT

This disclosure describes a technique to slow down or block creation of automated attack scripts by configuring a detector to discriminate whether particular attack-like activity is a true attack, or simply a hacker "testing" his or her automated attack script, and then permitting any such test script to continue working (attacking) the site, albeit on a limited basis. In this manner, the hacker receives an indication that his or her automated attack script is already working. Thereafter, when the detector later detects a launch of an actual attack based on or otherwise associated with the automated attack script (previously under test), the attack fails either because the script was not a working script in the first instance, or because information learned about the script is used to adjust the site as necessary to then prepare adequately for a true attack.

8 Claims, 5 Drawing Sheets

MITIGATING AUTOMATED ATTACKS IN A COMPUTER NETWORK ENVIRONMENT

BACKGROUND

Technical Field

This application relates generally to protecting websites and mobile applications (apps) from automated attacks by scripts or bots.

Brief Description of the Related Art

Over a billion user credentials (usernames, passwords, email addresses) were stolen during large breaches in 2014 and 2015. Hackers are now monetizing those stolen credentials across a wide range of popular web and mobile services. E-commerce, e-banking, online sharing, social networks, travel web sites, online ticketing, educational services, healthcare, insurance, gaming, etc. have become targets of the use of stolen credentials. Hackers know that people commonly reuse their credentials across the web. Most people use about three usernames/handles and have two to three passwords. They exploit this knowledge by writing a variety of sophisticated scripts exercising multiple attack vectors to compromise popular web properties. These automated attacks are known variously as malicious bots or malicious scripts.

There are many significant challenges in detecting attacks with stolen credentials. Often the credentials themselves are legitimate. Hackers also hide within regular web and mobile user traffic by attacking during normal service hours and distributing attacks from commonly used devices with IP addresses across multiple geographic regions. It is increasingly difficult for many of the usual checks/detection methods to distinguish between real customers and attackers. Hackers adapt and change continuously, rotating through their arsenal of attack vectors, scripts, and/or deployment schemes, allowing them to evolve against standard detection schemes.

Current methods to deter and block attacks include employing Captchas, device identification, browser identification, IP address tracking, and network log analysis. While these approaches provide significant benefits, there remains a need in the art to provide new techniques, especially with respect to mitigating unauthorized automated attacks, which remain a significant problem for websites and mobile apps, primarily because an attacker can easily create and test his attack scripts before deploying a large scale attack.

BRIEF SUMMARY

This disclosure describes a technique to slow down or block creation of these attack scripts in the first instance. To this end, and according to this disclosure, a detector is configured to discriminate whether particular attack-like activity is a true attack, or simply a hacker "testing" his or her automated attack script. This discrimination is carried out based on one or more detection mechanisms, such as transaction rate checks, analytical checks, user history checks, aggregate analysis, IP location checks, and other behavioral checks. Machine learning may be used to facilitate this process and the attack versus test detection. Upon a determination that an automated attack script is being tested, and in lieu of blocking the automated attack script, the detector actually permits the test script to continue running, e.g., by providing limited access to a resource on the site. In this manner, in effect the hacker receives a false indication that his or her automated attack script is already working. Thus, when the detector later detects a launch of an actual attack based on or otherwise associated with the automated attack script (previously under test), the attack fails either because the script was not a working script in the first instance, or because information learned about the script is used to adjust the site as necessary to then prepare adequately for a true attack.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

By way of background, and as used herein, the notion of an "actual attack" relates to an act of running large scale automated activity (e.g., testing millions of login/password combinations). In contrast, a "testing phase" relates to a process in which the attacker creates a script and then tests its efficacy. This notion is sometimes referred to herein as a "script-under-test." For example, the script may be an automated program that can successfully login using valid/test credentials. Typically, an attacker engages in the testing phase prior to the actual attack to ensure the script successfully works; otherwise, it is a significant waste of resources (and a wasted expense) for an attacker to deploy an actual attack with a non-working script. The testing phase can also be called training or any other term to describe the process of creating a working script.

As is well-known, automated activity may include form transactions (e.g., logins, signup, payments transactions), clicking, or even simple navigations (web-scraping, or the like). To simplify the following description, the technique herein is described in the context of an example embodiment of logging into a website. This embodiment, however, is merely representative, as the mitigation technique herein may be used irrespective of the type of automated attack vector.

Creating a "working" login script typically involves two steps. First, the script should be able to functionally login to a website in an automated fashion without any human assistance. A known technique often exploited is application programming interface (API) reverse-engineering on the part of the attacker, and directly passing credentials to the API interface. A more advanced technique might involve going through the full web-experience, e.g., by using a headless browser or other tools. Second, and apart from being able to functionally pass credentials, the script needs to be able to circumvent or bypass security technologies. If a security tool detects an automated login, typically it will block the script by either rejecting the login (even if the credentials are valid), or by asking for additional verifications (e.g., solving a test, such as a test using the Captcha™ technology). As is well-known, Captcha™ technology is a program or system intended to distinguish human from machine input, typically as a way of thwarting spam and automated extraction of data from websites. A "working" login script thus also needs to be able to successfully fool a security tool and not get detected by such security technology. An attacker of course can tweak, train, or test the script until he or she has achieved this goal.

The technique of this disclosure, however, is designed to convince the attacker that such further tweaking, training or testing is no longer required. Thus, the notion here in effect is to fool the attacker into believing that the script-under-test is actually working and, as a consequence, does not necessarily need further refinement. In this way, the system can learn and adapt its security measures appropriately.

To this end, the embodiments described herein use an approach to confuse the attacker during this second step (the testing phase). In one embodiment, a security tool (e.g., a threat detector, a threat detection and response server, etc.) detects and distinguishes an actual attack from the testing phase. When the security tool detects testing phase activity, and instead of blocking the attacker, the security tool lets the attacker through. This gives an artificial illusion to the attacker that he or she has a working script. Then, when an actual attack is later launched, the attack is blocked easily either because the script was not a working script in the first place, or because the site is adapted in advance as necessary to then block the actual script. The latter situation may be implemented for example when the test script exhibits some degree of efficacy. In this manner, and in addition to the value of blocking the attack, the security tool slows down or blocks the attacker from developing a successful working script.

The operations of the security tool can be implemented in various configurations other than in a threat detector, or threat detection and response server. For example, the security tool can be deployed in a web server or a mobile server. More generally, the security tool of this disclosure may be implemented as processing logic that may comprises software, firmware, hardware, or any combination thereof.

Figure 1:
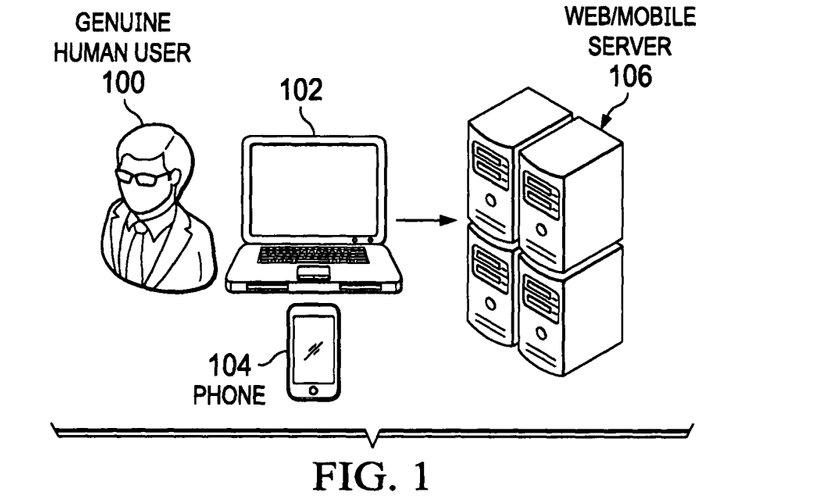
FIG. 1 shows a typical client-server configuration where a human being is performing an authorized action on a website/mobile app.
Figure 2:
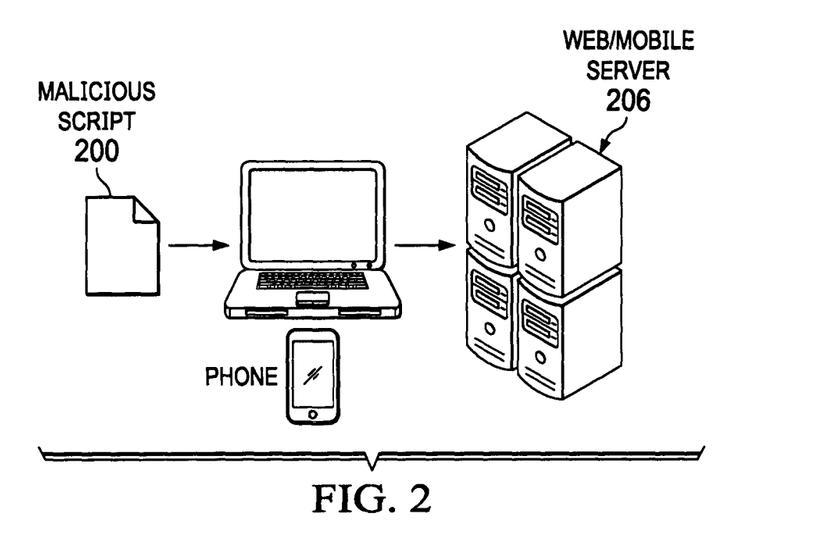
FIG. 2 depicts a malicious situation where a script is being used to perform an automated action.
Figure 3:
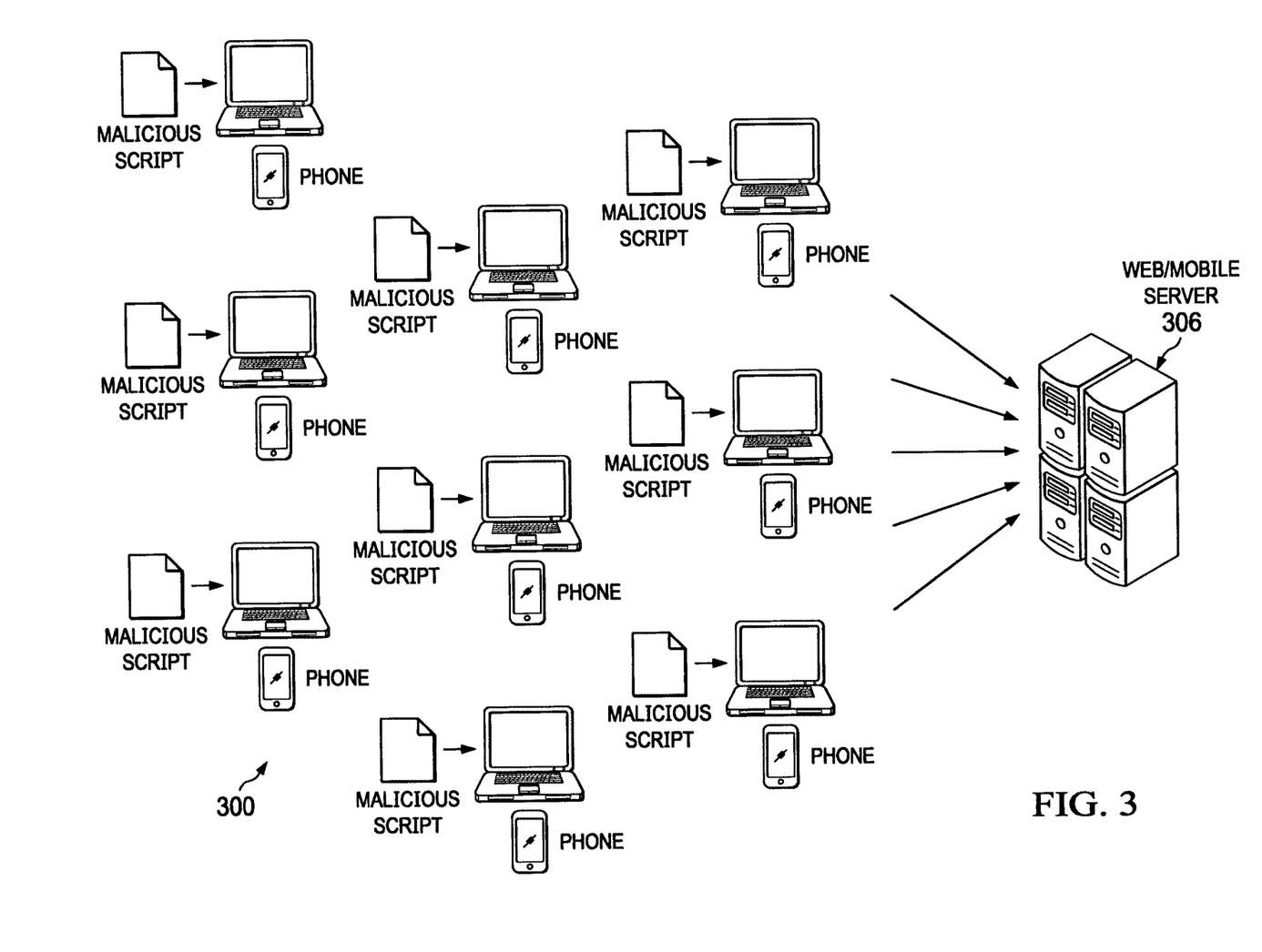
FIG. 3 depicts a large scale attack where the malicious script used in FIG. 2 is deployed across multiple computers.

FIG. 1 shows a typical client-server configuration where a human being 100 is performing an authorized action from his or her client machine browser 102 or mobile device app 104 with respect a web/mobile app server 106. FIG. 2 depicts the same scenario but instead shows a malicious script 200 is being used to perform an automated action (e.g., via the client machine browser or mobile device app) on the remote web/mobile app server 206. Creation of an attack script is typically done in this configuration. A larger attack can also be done by running the script repetitively with high frequency. As previously noted, this type of automated activity can be very damaging, especially if the hacker learns that his or her test script is efficacious. To that end, FIG. 3 depicts a large scale attack where the malicious script used in FIG. 2 is deployed across multiple computers 300, and among other serious security problems, this type of attack can lead to a denial-of-service at the web/mobile app server 306.

Figure 4:
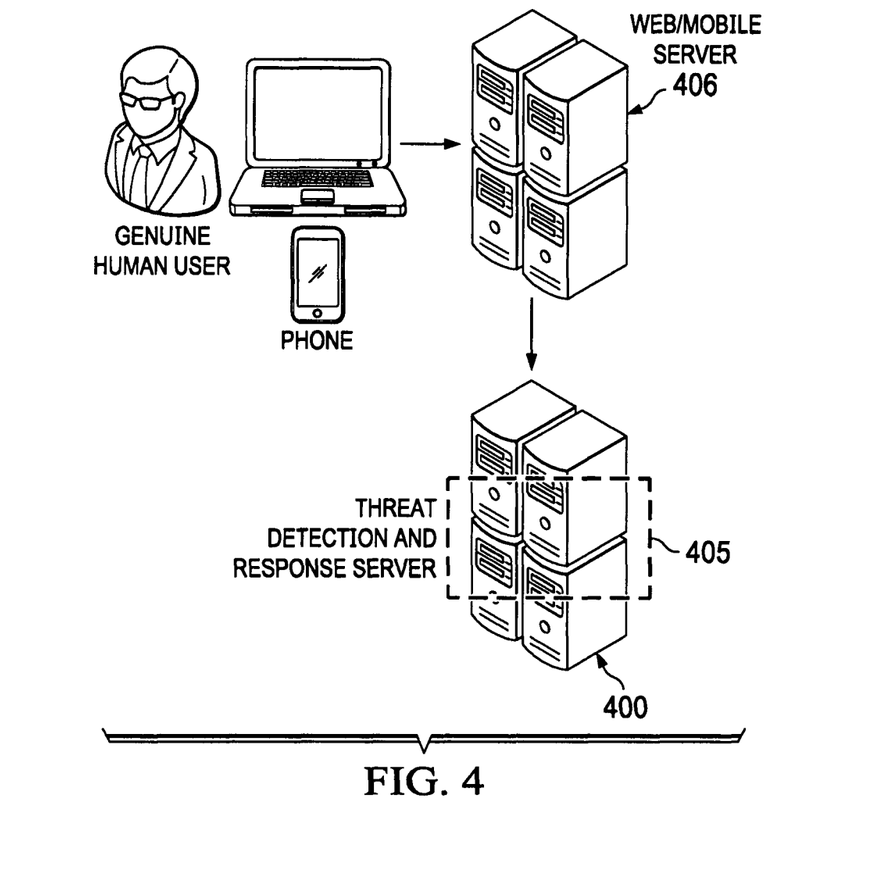
FIG. 4 depicts a configuration where a security tool is deployed on a separate threat detection and response server to protect the site or application.
Figure 5:
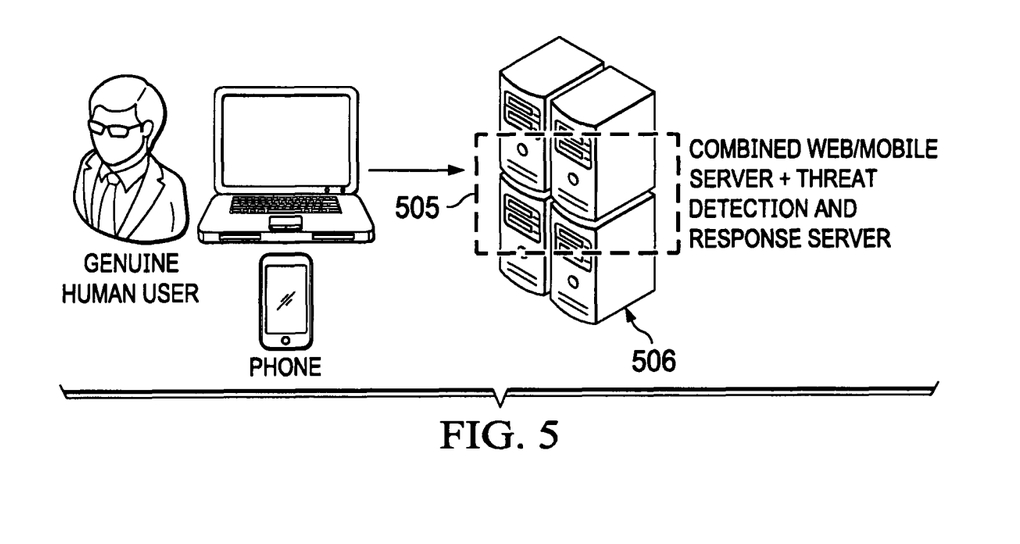
FIG. 5 depicts an alternative configuration where the security tool is deployed as being integrated with the web/mobile server itself.

FIG. 4 depicts a known configuration where a security tool 405 is deployed on a separate threat detection and response server 400 to protect the site/mobile app server application 406. In this example scenario, the security tool is deployed in a co-located manner, but this is not a limitation, as the security tool operations may be carried as a managed service (e.g., in a cloud-based environment) by a service provider dedicated to provide such service, by a third party (e.g., a content delivery network (CDN) service provider, or the like. FIG. 5 depicts an alternative configuration where the security tool 505 is deployed as being integrated with the web/mobile server 506 itself. Typically, the security tool is implemented as computer software (one or computer programs executed in one or more hardware processors).

Figure 6:
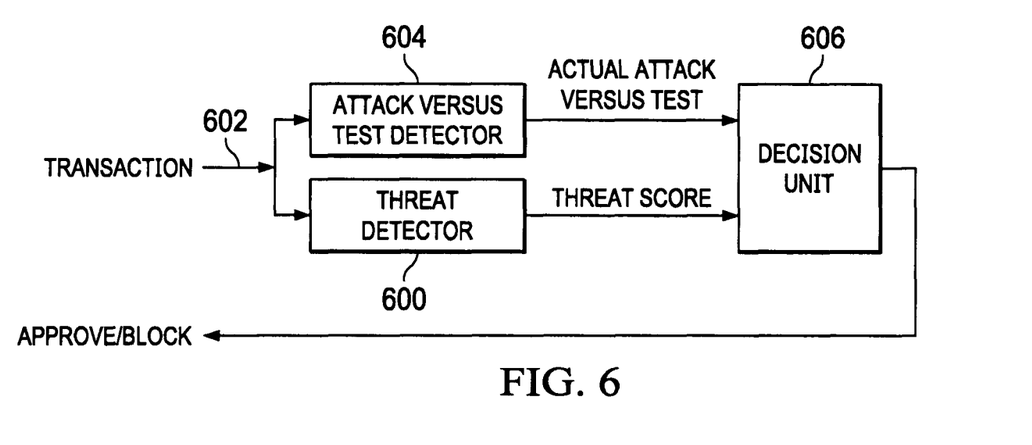
FIG. 6 depicts augmenting a threat detector with an attack versus test detector tool to facilitate the mitigation technique of this disclosure.

FIG. 6 depicts conventional processing of the security tool 600 with respect to an incoming transaction 602. The notion of a transaction here typically refers to one or more actions initiated by the automated script, e.g., an HTTP request for a particular resource, an operation triggered by scripting code, an AJAX request-response interaction, or any other activity initiated from the client and directed to the server. In a conventional system such as described above, the transaction is processed by a threat detector, and a decision is returned based on the likelihood that the transaction is a threat. Techniques for discriminating human versus automated script behavior are described, for example, in commonly-owned U.S. Pat. No. 9,639,699, titled "Detecting non-human users on computer systems," the disclosure of which is incorporated herein by reference. According to this disclosure, preferably the security tool threat detector 600 is paired with an attack versus test detector process/module 604 and a decision entity process/module 606 In operation, the attack versus test detector 604 determines whether the transaction 602 is coming as part of an actual attack (such as that in FIG. 3), or whether it is a training/testing attempt on part of the attacker. Based on this determination, the detector 604 notifies the decision unit 606 accordingly. The decision unit 606 takes in the input from both the threat detector 600 and from the attack versus test detector 604. If it is determined that this is a test/training transaction, the decision unit 606 may choose not to block or otherwise flag the transaction (unlike a conventional system that would block/flag the transaction). Accordingly, the attacker obtains or develops the false notion that he or she has a working attack script. Thus, when the attack script is deployed later in an actual attack (such as that in FIG. 3), the attack versus threat detector 604 then marks the transaction as an actual attack. The decision unit 606 then takes this information and blocks or otherwise mitigates the transaction.

In this manner, the security tool thus slows down, confuses, or blocks the attacker from testing or training in a manner that would be effective (to the attacker).

Figure 7:
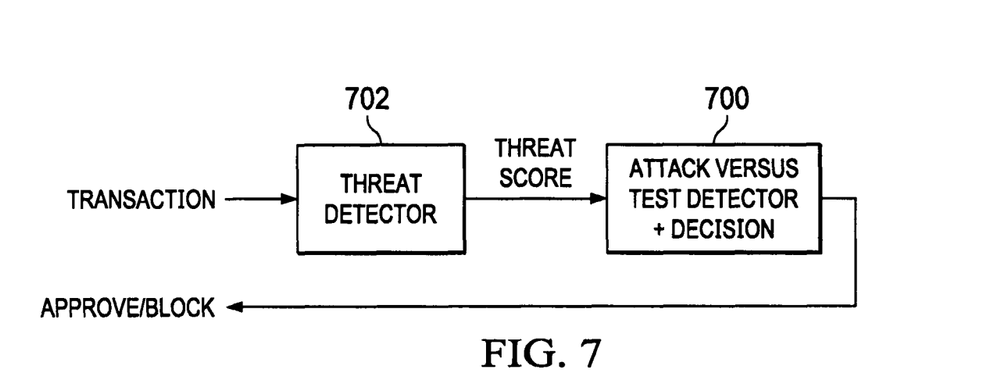
FIG. 7 depicts an alternate embodiment wherein the attack versus test detector is integrated with a decision unit.
Figure 8:
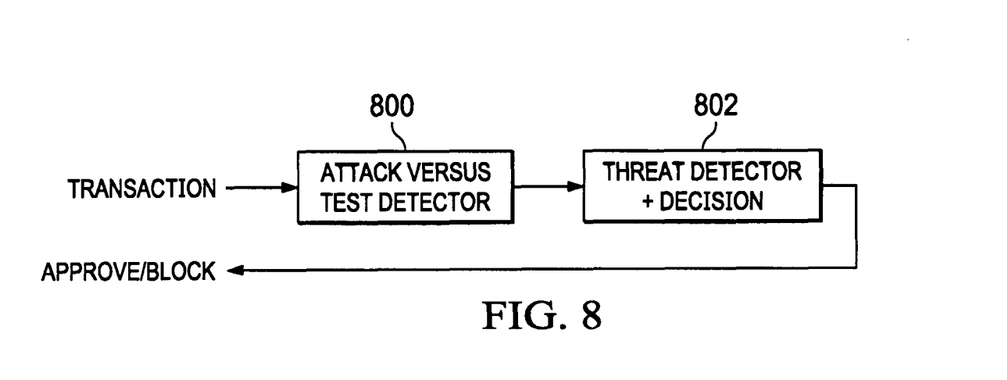
FIG. 8 depicts another yet alternative embodiment wherein the threat detector is integrated with the decision unit, and wherein the attack versus test detector is operated in a standalone manner.
Figure 9:
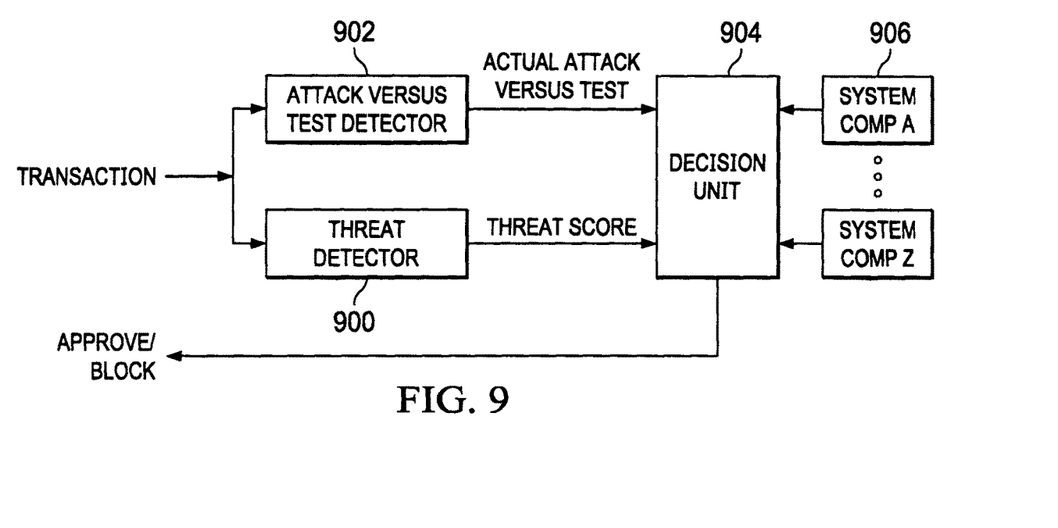
FIG. 9 depicts yet another alternative embodiment of the security tool implementation of this disclosure.

FIG. 7 depicts an alternate embodiment of an implementation of the security tool shown in FIG. 6. In this embodiment, the attack versus test detection and then decision unit are integrated into a combined unit 700, which also receives the output generated by the threat detector 702. Thus, the threat detector 702 first performs threat analysis, followed by the attack versus test detector analysis. FIG. 8 depicts yet another alternative embodiment of an implementation of the security tool, wherein the attack versus test detector 800 operates first and in a standalone manner. The output is then provided to a combined threat detector/decision unit 802. FIG. 9 depicts yet another alternative embodiment. In this embodiment, and like in FIG. 6, the threat detector 900, the attack versus threat detector 902, and the decision unit 904 operate independently, with the decision unit 904 augmented to receive other conventional components 908 to facilitate the decision making. These other components include, without limitation, knowledge sources, databases, expert systems, and the like.

Figure 10:
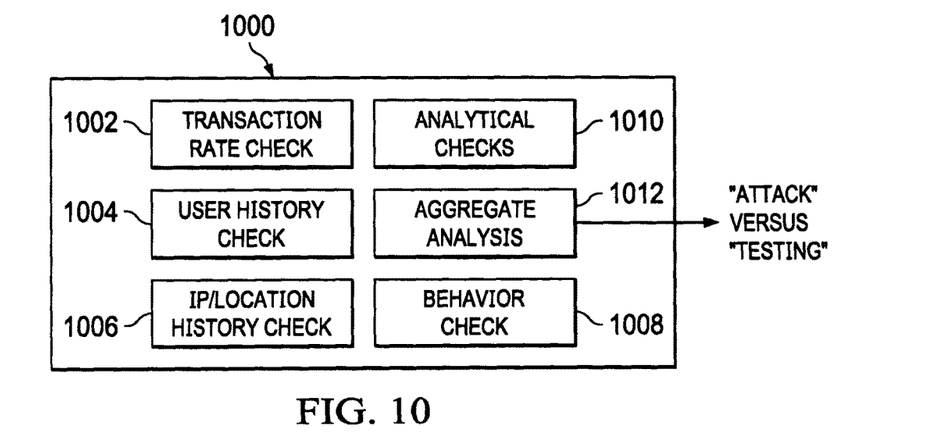
FIG. 10 depicts processing modules that may be used in the detector of this disclosure.

FIG. 10 shows a detailed view of an embodiment of various processing modules that comprise the attack versus test detector 1000. These processing modules are exemplary, and one or more of them may be used. As noted above, the attack versus test detector 1000 determines whether the transaction is part of an attack, or rather just a training/test attempt. The method or sub-modules that facilitate this determination include, a transaction rate check 1002 that can be applied to see the frequency of incoming transactions. A higher frequency is indicative of an attack vs a training/test attempt. A user history check 1004 can be applied to see patterns from the specific user. An IP/Location history check 1006 can be applied to see a history of training/testing activity and other malicious behavior. Additionally, evidence of multiple IP's sending malicious transactions is indicative of an actual attack. General behavioral checks 1008 can be applied on various flags, and a module 1010 may also perform one or more custom analytical checks 1012. The output(s) from these various sub-modules preferably are sent to an aggregate analysis sub-module/unit 1012. Unit 1012 uses statistical/machine learning or other artificial intelligence techniques to classify the transaction either as an actual attack or, instead, a test/training attempt. Representative analysis technique may include, among others, nearest neighbor, Manhattan distance, Euclidean distance, neural networks, fuzzy logic, k-means, support vector machines (SVM) or other statistical/pattern matching/machine learning techniques.

The transaction rate check 1002 is described in more detail with an example of a possible implementation. In particular, the system maintains a counter or counters that a) increment based on certain events, and b) get reset at periodic intervals. Preferably, the counter is incremented when a scripted login is detected. Optionally, multiple parallel counters can be created, and where a signature/pattern is associated with each counter. The signature/pattern can be based on the script device fingerprint or other behavioral attributes (e.g., mouse/keystroke characteristic of the script). Assuming there are multiple counters (each with an associated signature), the counter that is associated with the training script is incremented at a much lower rate, as the attacker is just testing the script. Periodically, the counter is reset (with the periodic interval being configurable). At any point of time, the value of the counter is compared to a programmable threshold. If the value exceeds the threshold, this implies an actual attack has been initiated; otherwise, it is a training attempt. Resetting the counter at periodic intervals ensures the counter for a training attempts does not artificially hit the threshold.

The user history check 1004 is described with an example of a possible implementation. During the training process the attacker typically uses credentials that he/she personally created as a throwaway account. In a prior training session, the system (e.g., using technique 1002) may have detected the training attempts and. at that point, this module tabulates the user credentials used in the training activity. These user credentials are then stored in a table as attacker credentials. Subsequently, and in a new training phase, if the module then sees multiple hits to this table the system marks this as a training phase and not a real attack.

Of course, the above techniques are merely exemplary.

Other statistical, probabilistic or combined techniques may be implemented to facilitate the attack versus test determination.

A given attack versus test determination may have a confidence level (or weight) associated therewith. The type of response generated by the decision unit may also be based on the confidence level value and its relationship to one or more confidence levels, which levels may be pre-configured or hard-coded.

Enabling Technologies

The techniques herein may be implemented in a computing platform, such as variously depicted in FIGS. 6-9, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

One preferred implementation of the detector is in a managed service such as a content delivery network (CDN) or, more generally, an "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

What is claimed is as follows:

1. A method to mitigate automated attacks directed to a computing platform environment, comprising:

configuring a detector to discriminate an actual automated attack from testing of an automated script designed to initiate an attack on the computing platform environment;

following configuration of the detector, and upon a given occurrence of a particular transaction associated with an automated script designed to initiate an actual automated attack on the computing platform environment, determining, using the detector, whether the particular transaction is associated with testing of the automated script;

upon a determination that the particular transaction is associated with testing of the automated script, enabling the automated script to execute in the computing platform environment, such that the execution of the automated script provides an indication that the automated script executed correctly; and following the enabling of the automated script, blocking or mitigating operation of the automated script upon its attempted subsequent use in the computing platform environment.

2. The method as described in claim 1 wherein the detector operates either in a standalone manner, or as a managed service.

3. The method as described in claim 1 wherein the detector performs a set of one or more detection processes to make the determination.

4. The method as described in claim 3 wherein the set of detection processes include one of: a transaction rate check, a user history check, an IP address/location check, a behavior check, and an analytical check.

5. The method as described in claim 4 wherein the determination is based on an aggregate analysis of the set of detection processes.

6. The method as described in claim 5 wherein the aggregate analysis implements a statistical or machine learning algorithm.

7. The method as described in claim 1 wherein the detector operates in association with a threat detector.

8. A computer program product in a non-transitory computer readable medium comprising computer program instructions executable in a computing platform environment by a hardware processor to:

discriminate an actual automated attack from testing of an automated script designed to initiate an attack on the computing platform environment;

upon a given occurrence of a particular transaction associated with an automated script designed to initiate an actual automated attack on the computing platform environment, determine whether the particular transaction is associated with testing of the automated script;

upon a determination that the particular transaction is associated with testing of the automated script, enable the automated script to execute in the computing platform environment, such that the execution of the automated script provides an indication that the automated script executed correctly; and following the enabling of the automated script, block or mitigate operation of the automated script upon its attempted subsequent use in the computing platform environment.

* * * * *